(12) United States Patent
Bereznai

(10) Patent No.: US 7,937,807 B2
(45) Date of Patent: May 10, 2011

(54) UNIVERSAL IMPACT-HINDER DEVICE

(76) Inventor: Jozsef Bereznai, Budapest (HU)

( * ) Notice: Subject to any disclaimer, the term of this patent is extended or adjusted under 35 U.S.C. 154(b) by 397 days.

(21) Appl. No.: 12/282,502

(22) PCT Filed: Mar. 9, 2007

(86) PCT No.: PCT/HU2007/000022
§ 371 (c)(1),
(2), (4) Date: Sep. 26, 2008

(87) PCT Pub. No.: WO2007/105019
PCT Pub. Date: Sep. 20, 2007

(65) Prior Publication Data
US 2009/0094789 A1   Apr. 16, 2009

(30) Foreign Application Priority Data

Mar. 10, 2006   (HU) .................................. 0600059 U

(51) Int. Cl.
  *E05F 5/06*   (2006.01)
(52) U.S. Cl. .................................. 16/82; 16/85; 16/86 A
(58) Field of Classification Search ................ 16/82, 85,
  16/86 A, 86 R, 86 B, 66, 69, 70, 71; 188/283,
  188/282.1, 282.4, 282.9, 281, 282.5; 248/188.4,
  248/410, 411; 292/23, DIG. 15, DIG. 19
  See application file for complete search history.

(56) References Cited

U.S. PATENT DOCUMENTS

| | | | | |
|---|---|---|---|---|
| 1,736,175 A * | 11/1929 | Rosenthal et al. ................. | 16/82 |
| 1,834,671 A * | 12/1931 | Armistead .......................... | 16/84 |
| 2,953,810 A * | 9/1960 | Hall .................................... | 16/52 |
| 3,376,088 A * | 4/1968 | Bol et al. ........................ | 292/353 |
| 3,593,367 A | 7/1971 | Waldo | |
| 4,079,925 A * | 3/1978 | Salin ............................. | 267/129 |
| 4,110,868 A * | 9/1978 | Imazaike .......................... | 16/84 |
| 4,423,535 A | 1/1984 | Ojima et al. | |
| 4,817,238 A * | 4/1989 | Liu .................................... | 16/66 |
| 5,579,874 A * | 12/1996 | Jeffries et al. .............. | 188/282.9 |
| 7,455,154 B2 * | 11/2008 | Bantle et al. ................... | 188/287 |
| 7,657,970 B2 * | 2/2010 | Artsiely ............................ | 16/85 |
| 2004/0231099 A1 | 11/2004 | Li | |
| 2007/0271732 A1 * | 11/2007 | Bantle et al. ....................... | 16/84 |
| 2009/0119873 A1 * | 5/2009 | Bassi ................................ | 16/84 |

FOREIGN PATENT DOCUMENTS

| | | |
|---|---|---|
| DE | 10261591 | 7/2004 |
| GB | 2180297 A | 3/1987 |

\* cited by examiner

*Primary Examiner* — Chuck Y. Mah
(74) *Attorney, Agent, or Firm* — Birch, Stewart, Kolasch and Birch, LLP

(57) ABSTRACT

Universal impact-hinder device, comprising a body (1); a guiding pin (4) arranged at the closed first end of an inside cylindrical cavity of the body (1), a spring (7) on the guiding pin (4); a ring (5) at the opposite end of the cavity; and a piston having a T-shaped head and an inside cavity in which the spring (7) is supported, which piston can move until the ring (5), while the guiding pin (4) is within the inside cavity of the piston. The T-shaped head is provided with a groove and a movable O-ring (6) within that, having two end positions in the groove. In first end position a surface of the groove having artificial damages (31) and the contacting O-ring (6) determine a first flow-through capacity, in second end position an orifice (21) between the cavity of the body and the groove determines a greater second flow-through capacity.

3 Claims, 2 Drawing Sheets

UNIVERSAL IMPACT-HINDER DEVICE

This application is the National Phase Under 35 U.S.C. §371 of PCT International Application No. PCT/HU2007/000022 which has an International filing date of Mar. 9, 2007, which claims priority to Hungary Application No. U0600059 filed on Mar. 10, 2006. The entire contents of all applications listed above are hereby incorporated by reference.

BACKGROUND OF THE INVENTION

The present invention relates to an universal impact-hinder device (so called "hit-damper") mainly for use with furniture mounted with forced or parliament hinges, weight-closing doors, drawers, or any similar opening-closing elements. More particularly the impact-hinder device comprising a body; a guiding pin arranged at the closed first end of an inside cylindrical cavity of the body, a spiral spring on the guiding pin; a ring at the opposite second end of the inside cylindrical cavity of the body; and a piston having a T-shaped head in cross section and an inside cavity in which the spring is supported, which piston is capable to move until the ring within the inside cylindrical cavity of the body, while the guiding pin is within the inside cavity of the piston.

There are many known shock absorbers and dampers of either gas or liquid filled kinds. These devices comprise several wearing components. In order to avoid wearing an asymmetric solution by force-dependent flow through can be used. Such a solution is known, e.g. from U.S. Pat. No. 7,175,154 (based on Hungarian patent application P0104144) disclosing an invention from the same inventor as now.

It is an object of the present invention to adapt the piston structure of U.S. Pat. No. 7,175,154 to impact-hinder damper devices, avoiding the known disadvantages.

SUMMARY OF THE INVENTION

According to the invention as disclosed in the opening paragraph the T-shaped head of the piston is provided with a groove and a movable O-ring within that, where the O-ring has two end positions in transversal direction of the groove. In its first end position a surface of the groove having artificial damages and the contacting O-ring determine a first flow through capacity. In the second end position an orifice between the inside cylindrical cavity of the body and the groove determines a second flow through capacity which is greater than the first flow through capacity.

The device hinds, damps impact on doors, especially in cases when the shut are urged by the force of spring biased or parliament hinges, by way of braking the movement during closing, and a leave the door closed with a pre-set low speed smoothly. In case of slow closing of the door—e.g. by hand—the device does not effect damping resistance, the door can be closed without any counter force.

BRIEF DESCRIPTION OF DRAWINGS

In the further description the invention will be described in details, with references to the drawings.

DETAILED DESCRIPTION OF THE PREFERRED EMBODIMENTS

Figure 1:
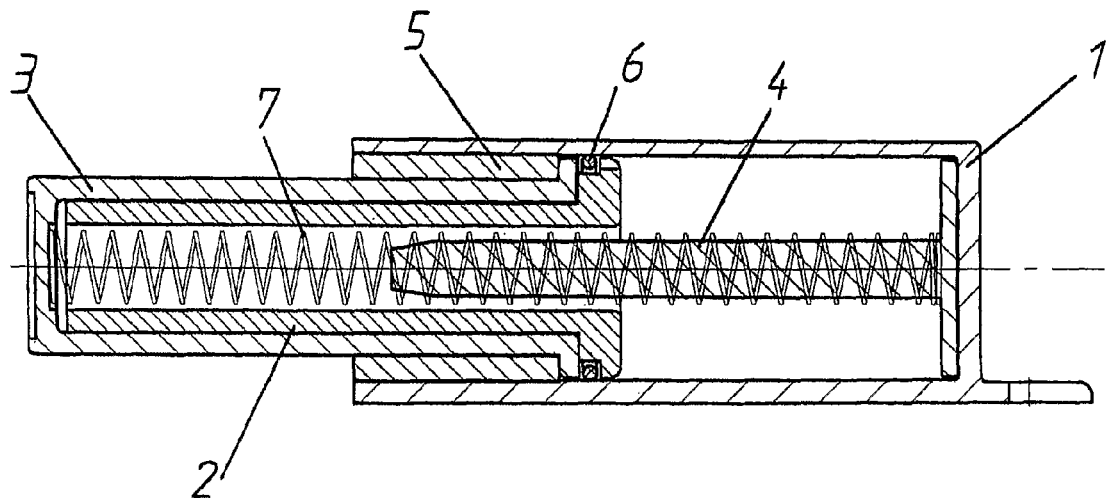
FIG. 1 shows a device according to the invention, in its open state, in cross sectional view.

FIG. 1 shows the structure of an exemplary embodiment of an impact-hinder device according to the invention. In the body 1 there are a guiding pin 4, a spiral spring 7 on the guiding pin, and a piston combination capable to move within the inside cylindrical cavity of the body 1. This piston combination is made of two parts, an inner first piston 2 and an outer second piston 3. The first piston 2 and the second piston 3 are matched into each other tightly thus constituting an integer part. Alternatively it can be manufactured from a single piece, by finishing the T-shaped head, but from the point of technology building from two parts is more advantageous. In its state shown in FIG. 1 the outer second piston 3 will be stopped (restrained) by a ring 6 at the open end of the body 1. At this time the end part of the second piston 3 protrudes fully out of the body 1.

Figure 2:
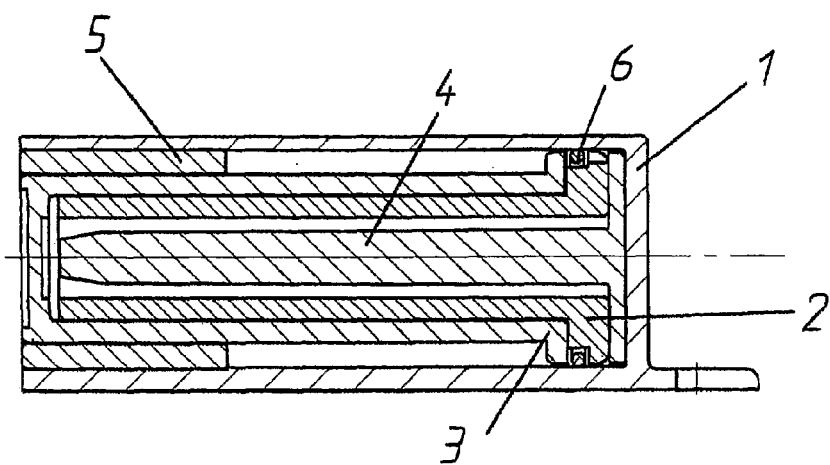
FIG. 2 shows a device according to the invention, in its closed state, in cross sectional view.

In its state shown in FIG. 2 the whole piston combination is pushed into the inside cavity of the body 1.

Figure 3:
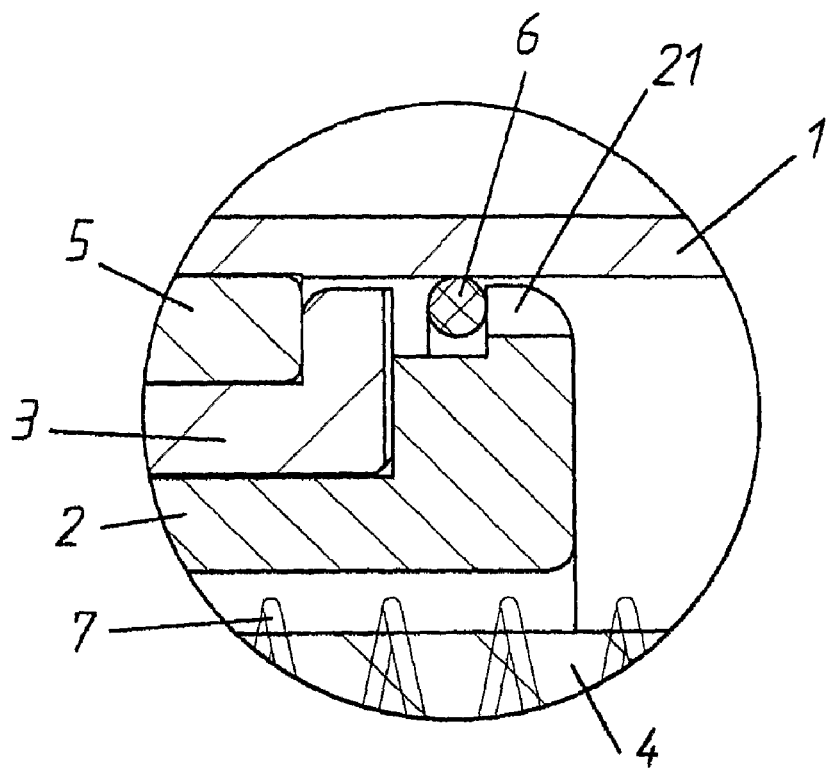
FIG. 3 shows a part of the piston of the device according to FIG. 1 and FIG. 2, when the corresponding door is open.
Figure 4:
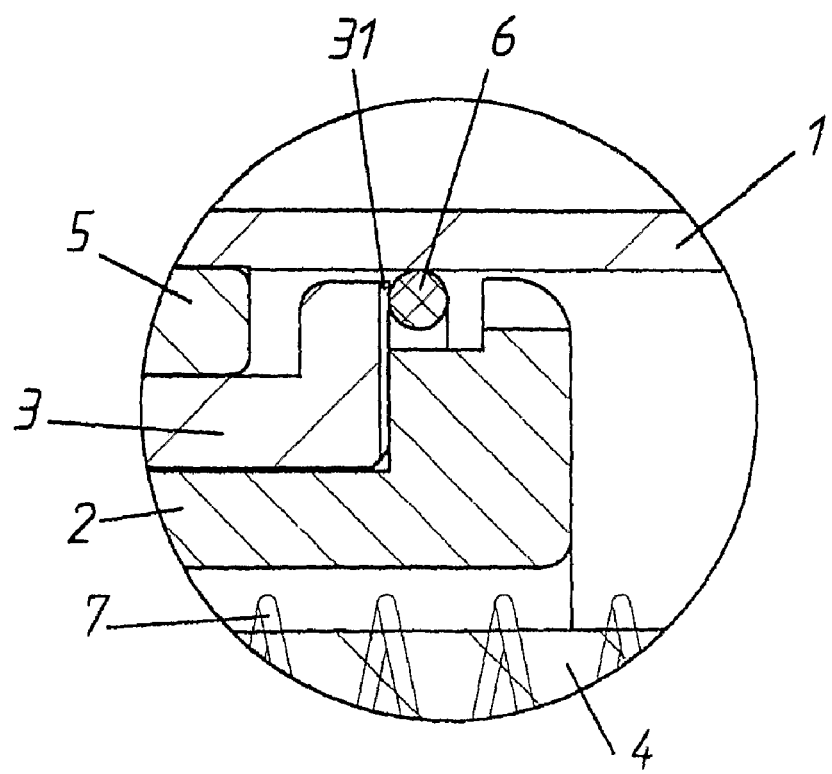
FIG. 4 shows a part of the piston of the device according to FIG. 1 and FIG. 2, when shutting the corresponding door fast.

The enlarged partial section of FIG. 3 shows the cross section of T-shape of the inner end of the piston combination and a contacting part of the inner wall of the body 1. An O-ring 6 is disposed in a movable manner in a circumferential groove of rectangular cross section of the double piston structure constituted by the first piston 2 and the second piston 3, by their rim portions. The piston in its two separate positions, i.e. in its positions shown in FIGS. 1 and 2 respectively, is capable to provide two different flow rates through the piston—as known from U.S. Pat. No. 7,175,154—for the filling (gaseous) media. This flow through the piston is due to artificial damages 31 and orifices 21 which ensure a controlled traffic of the filling media, e.g. air, between the alternating volume chambers on the two sides of the piston. The artificial damages 31 are made in the surface of the second piston 3 which is in bearing contact with the sealing element. When this bearing contact is effectual a given amount per time unit of a fluid media, e.g. air, can flow through the artificial damages 31, which can be provided in the form of e.g. grooves, recesses, notches, channels, etching, roughening, etc. or combination of them for ensuring flow-through. According to the other position of the sealing element illustrated in FIG. 3 an opening, an orifice 21 is prepared in the rim of the T-shaped head portion of the first piston 2, which provides greater, typically considerably greater transmission capability in respect of the air or other fluid media than that of the damages 31. This concludes that the motion of the piston combination in the inside cylindrical cavity space of the body 1 can be different in speed considering the two possible moving directions. This feature provides a damping, impact absorbing function as an important essence of the invented impact-hinder device.

A part of the body 1, e.g. its down side in FIG. 2 or 3, can be formed as a flat support flange for fixing to a furniture surface by gluing or screwing. The gluing can be performed by an adhesive strip on the flat support flange. This ensures sufficient fixation in most cases, but screwing through an additional hole in the flange is also possible if required. When the device is to be mounted on a stepped part on the furniture a rear support element can be attached to the outer closed end of the body 1. This rear support can be an adjustable at various height positions relative to the support flanges, e.g. by an arresting mechanism. The supporting plate of this rear support can be covered also by adhesive material. Thus two different fixing plane can be used for installation by gluing of the device.

The application and working of the universal impact-hinder device of the invention will now be described in an embodiment for use with a cupboard door.

The impact-hinder device according to the invention will be mounted to an inside surface of the furniture wall, e.g. onto the top wall, near to the door, with its fully pushed in piston rod by the door when that is closed. For this purpose the adhesive strip on the flat support flange of the body 1 can be used, or the device can be screwed onto the furniture wall. It is to be noted that the adhesive strip only is sufficient for most cases. This makes possible to easily adapt the device to furniture doors, windows, drawer front plates, or any other movable functional elements without causing any deterioration of those elements.

If one opens the door the force stocked in the compressed spring 7 guided on the guiding pin 4 pushes forward the piston formed by the first piston 2 and the second piston 3, which are fitted tightly into each other, until the piston hits the ring 5. This position will now be called as open position. The spring can be replaced by other mechanism providing a return of the piston to open state. Since then the O-ring 6 being in forced contact with the first piston 2 is blocking the flow-through between the inner surface of the cylinder cavity of the body 1 and the first piston 2, arising vacuum would prevent outward moving of the piston. Therefore an orifice 21 is to be cut in the first piston 2, through which air can be flow into the back chamber of the cavity of the body 1. The size of this orifice 21 in the first piston 2 or in other words a second flow through capacity will determine the forward velocity of the piston.

When the door is open, the device is in its open state in stand-by mode.

If the door is suddenly shut the front of the door will hit the front end of the protruding piston in its open state, and the force, the moment of inertia will cause that to be pushed inwardly. This front end of the piston can be rounded and can be made of soft material to absorb impact. Due to the quick inward motion the O-ring 6 hits the wall surface of the second piston 3, and thus cutting off the flow of air between the inner wall of the body 1 and the second piston 3 with the artificial damages 31 on that. As a consequence of the motion the air is compressed in the closed inside cavity of the body 1 and constitutes a resistance (air spring) which braking the motion of the piston, and pressing the O-ring 6 into the artificial damages 31, closes at least partially the ducts of the damages, causing a partial closure of flow through that. The bigger the inward force on the second piston 3, the greater the braking counter effect. In this way the counter force makes the door got slower. When the speed of the door gets below a given value, its inertial energy—and thus the force on the piston—will be decreased, the pressure in the body 1 becomes lower, and even a smaller force presses the O-ring 6 to the wall of the second piston 3. The O-ring 6 getting rid of the high overpressure regains its original shape and does not fill the damages 31 on the surface of the second piston 3 longer, thus does not block the air transfer from the back chamber of the body 1, and this allows the piston to move back into the cavity of the body 1. The size or measure of the artificial damages 31 on the groove side surface of the second piston 3, i.e. the measure of the gas transfer through those damages 31 or in other words first flow through capacity will determine the speed of the door shut.

In case of slow speed closing of the door the piston velocity does not exceed the corresponding amount of air per time unit through the artificial damages 31, thus the O-ring 6 does not press into and does not close the ducts formed by the artificial damages 31. The open orifice 21 is ready to conduct out air from the chamber of the body 1. The door can be closed practically without any retarding counter force.

The solution according to the invention has an advantage that the damping, retarding counter force is proportional with the original shut force to be damped. A further advantage lies in that the invasion of the O-ring or other resilient sealing means into the damages of the piston according to the invention does not involve wearing, in contrast to the state of art door dampers, door brakes, thus the lifetime of this device can be considerably longer. A specific advantage that the self adhesive strip or occasionally the holes for screws renders possible application of the device for furniture in use, or at any time after installation of the respective doors or the like.

What is claimed is:

1. Universal impact-hinder device, comprising a body (1); a guiding pin (4) arranged at a closed first end of an inside cylindrical cavity of the body (1), a spiral spring (7) on the guiding pin (4); a ring (5) at the opposite second end of the inside cylindrical cavity of the body (1); and a piston having a T-shaped head in cross section and an inside cavity in which the spring (7) is supported, which piston is capable to move within the inside cylindrical cavity of the body (1) between the closed first end and the ring (5), while the guiding pin (4) is within the inside cavity of the piston, wherein the T-shaped head of the piston is provided with a groove and a movable O-ring (6) within said groove, where the O-ring (6) has two end positions in transversal direction of the groove, in the first end position a surface of the groove having artificial damages (31) and the contacting O-ring (6) determine a first flow through capacity of a fluid medium, where pressing the O-ring (6) into the artificial damages (31) closes partially ducts of artificial damages (31) thus reducing the first flow through capacity, and in the second end position an orifice (21) between the inside cylindrical cavity of the body (1) and the groove determines a second flow through capacity of said fluid medium which is greater than the first flow through capacity.

2. The device according to claim 1, wherein the piston having an inside cavity is made of two parts fitted concentrically into each other, where the groove of the piston is formed between rims of said two parts (2,3).

3. The device according to claim 1, wherein the body (1) is provided with flat support flange for fixing to a furniture surface by gluing or screwing.

* * * * *